United States Patent [19]

Tate et al.

[11] 3,843,672

[45] Oct. 22, 1974

[54] CYANO DERIVATIVES OF 2-SUBSTITUTED-2-OXAZOLINES

[75] Inventors: Bryce E. Tate, Niantic; Rudolph G. Berg, Groton, both of Conn.

[73] Assignee: Pfizer Inc., New York, N.Y.

[22] Filed: July 6, 1973

[21] Appl. No.: 376,955

[52] U.S. Cl............................................ 260/307 F
[51] Int. Cl............................................ C07d 85/38
[58] Field of Search................................ 260/307 F

[56] References Cited
UNITED STATES PATENTS
3,769,295  10/1973  Hoyle et al...................... 260/307 F Primary Examiner—Richard J. Gallagher
Assistant Examiner—Anne Marie T. Tighe
Attorney, Agent, or Firm—Francis X. Murphy; Charles J. Knuth; Allen J. Spiegel

[57] ABSTRACT

Itaconic acid is prepared by hydrogen cyanide addition to 2-(3-hydroxy-2-propenyl)-4,4-dialkyl-2-oxazoline in the presence of a solvent and an alkaline catalyst, dehydrating the resulting product at 70°–140° C. in the presence of a lower aliphatic carboxylic acid or anhydride or mixture thereof, hydrolyzing under reflux conditions with an aqueous mineral acid, and recovering the itaconic acid produced or recovering isomers which are convertible to itaconic acid. Also, novel intermediates resulting from the above cyanide addition and subsequent dehydration are disclosed.

4 Claims, No Drawings

CYANO DERIVATIVES OF 2-SUBSTITUTED-2-OXAZOLINES

BACKGROUND OF THE INVENTION

The present invention discloses a process for making itaconic acid, a valuable raw material for synthetic resins.

Itaconic acid has been prepared by fermentation procedures, or by pyrolysis of citric acid with or without a catalyst to yield citraconic acid or anhydride followed by isomerization of the resulting aqueous citraconic acid solution to yield itaconic acid.

SUMMARY OF THE INVENTION

The present invention discloses a process for making itaconic acid comprising the steps of:

a. reacting a compound having the formula

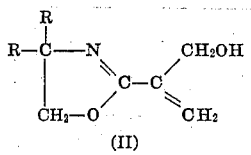

(II)

wherein R is alkyl having 1 to 4 carbon atoms, with hydrogen cyanide in the presence of an alkaline catalyst and a solvent to form a compound having the formula

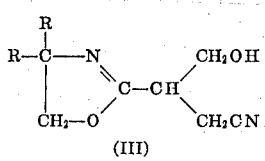

(III)

b. dehydrating said compound (III) in the presence of a lower aliphatic carboxylic acid or anhydride at a temperature of about from 70° to 140° C. to form a compound having the formula

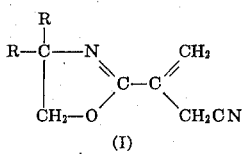

(I)

or dehydrating said compound (III) in the presence of a tertiary amine salt catalyst in a high boiling inert solvent at a temperature of from about 130° to 160° C. to form a compound of the formula

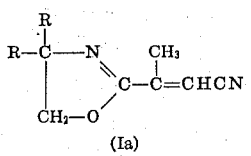

(Ia)

or mixtures of compounds (I) and (Ia);

c. heating said compounds (I), (Ia) or mixtures thereof under reflux conditions in the presence of aqueous mineral acid; and d) recovering the itaconic acid or its double bond isomers or mixture thereof produced.

Also contemplated within the scope of the present invention is the above process wherein the member in (b) is acetic acid or anhydride.

Alternatively, and within the scope of the present invention, the sequence of double bond introduction (b) and hydrolysis (c) can be reversed whereby hydrolysis of (III) gives the itaconic acid isomer, paraconic acid, which is the lactone of hydroxymethylsuccinic acid. Paraconic acid may then be converted to itaconic acid as disclosed in our co-pending application Ser. No. 300,458.

Also contemplated within the scope of the invention are the novel compounds having the formulae (I) and (Ia) and their precursors, having the formula (III).

DETAILED DESCRIPTION OF THE INVENTION

The reactants (II), 2-(3-hydroxy-2-propenyl)-4,4-dialkyl-2-oxazolines, can easily be prepared by reacting the appropriate 2-amino-2,2-dialkyl-1-ethanol compound with glacial acetic acid (e.g., see P. Allen, Jr. and J. Ginos, *J. Org. Chem.*, Volume 28, pp. 2,759–62, October 1963), and reacting the resulting 2-methyl-4,4-dialkyl-2-oxazoline compound with formaldehyde under anhydrous conditions (e.g., see W. Seeliger et al., *Angew. Chem. Internat. Edit.*, Volume 5, No. 10, pp. 875–88 (1966)) to give the reactants (II).

The reaction in which compound (II) is contacted with hydrogen cyanide to give compound (III) is carried out in the presence of an alkaline catalyst and a reaction-inert solvent which at least partially solubilizes the catalyst. The alkaline catalyst can be typically, but is not limited to alkali or alkaline earth hydroxides (e.g. KOH, NaOH) or cyanides (e.g. KCN, NaCN), tertiary aliphatic amines and diamines containing up to 12 carbon atoms, and quaternary ammonium hydroxides containing alkyl groups of 1–12 carbon atoms. (e.g. cetyl trimethyl ammonium hydroxide). The solvent is preferably an aromatic type, such as benzene, toluene, or xylene, boiling at 80°–160° C. (atmospheric pressure). Other solvents providing suitable catalyst solubility which are compatible with reagents and products may be used, e.g. acetonitrile, dioxane or the dimethyl ether of triethyleneglycol. The hydrogen cyanide may be added either as a liquid or gas, continuously or in portions. It is usually also desirable to keep the reaction temperature below about 120° C., and preferably below about 80° C.

The product may be used in the next step without purification but better overall results are obtained if it is distilled and the distillate allowed to crystallize enabling separation from non-crystalline by-products. The distillation may be performed on the crude reaction mixture but better results are obtained if the alkaline catalyst is neutralized with a mineral acid prior to distillation.

The dehydration of compound (III) to compound (I) may be accomplished in the presence of any liquid or low melting lower alkanoic acid, anhydride, mixed anhydride or mixture of all three. By lower alkanoic is meant those containing from one to four carbon atoms in the acid or the parent acids corresponding to the anhydrides. Preferably, acetic acid and/or anhydride are used. Temperatures of from 70°–140° C. are preferred although both lower and higher temperatures are operable.

Compounds (Ia) or mixtures of (I) and (Ia) may be obtained by dehydrating compound (III) in reaction-inert solvents using mineral acid salts of tertiary amines containing up to 12 carbon atoms, such as triethylenediamine hydrobromide or hydrochloride, as catalysts at about 130°–160° C. The reaction-inert solvents which may be used are of the aromatic type, such as benzene, toluene, chlorobenzene, decahydronaphthalene or xylene. The preferred solvent is xylene, decahydronaphthalene or chlorobenzene. Under the mildest reaction conditions the itaconic derivatives (I) are obtained while under more vigorous conditions increasing amounts of the itaconic derivatives (Ia) may be formed.

In the hydrolysis step, mineral acids suitable for this step include, but are not limited to, sulfuric, phosphoric and hydrochloric. Aromatic sulfonic acids also provide satisfactory results although hydrochloric acid is preferred. The concentration of acid is not critical but solutions of about 10 percent concentration usually provide a cleaner product than those of appreciably higher concentration. The amount of acid is not critical as long as a sufficient quantity is available to completely neutralize the basic materials generated during the hydrolysis. Using only a slight excess over the theoretical amount required is preferred for reasons of economy. Temperatures preferred for this hydrolysis are from about 75° to 160° C. The itaconic acid isomers, mesaconic acid and citraconic acid produced by the hydrolysis of compound (Ia) may be converted to itaconic acid by heating in water (R. P. Linstead and J. T. W. Mann; J. Chem. Soc., 1931, 726 and U.S. Pat. 3,701,805). The itaconic acid produced thereby can be conveniently recovered by evaporating the resulting mixture to dryness, and water-washing and drying the residue.

When compound (III) is heated with aqueous inorganic acid, water is not eliminated to give compound (I), but instead hydrolysis of the oxazoline and nitrile groups occur. Hydroxymethyl-succinic acid may be formed as an intermediate, and then undergo lactonization to paraconic acid, or paraconic acid may be formed directly.

Paraconic acid which is isomeric with itaconic acid can be considered as the lactone resulting from ring closure involving the carboxyl groups and the double bond of itaconic acid. Paraconic acid may be converted to itaconic acid via citraconic acid as disclosed in our copending application Ser. No. 300,458.

The following examples are provided for illustrative purposes and should not be interpreted as limiting the invention.

EXAMPLE I

A. Addition of Hydrogen Cyanide to 2-(3-hydroxy-2-propenyl)-4,4-dimethyl-2-oxazoline to give 2-(1-cyano-3-hydroxy-2-propyl)-4,4-dimethyl-2-oxazoline To a 250 cc 3-necked flask fitted with a heating mantle, magnetic stirrer, thermometer equipped with a temperature controlling device, an efficient jacketed reflux condenser through which is passed precooled water and an equalizing dropping funnel was placed 60 cc xylene, 0.8 g (12 mmoles) potassium cyanide and 39.0 g (240 mmoles) of 2-(3-hydroxy-2-propenyl)-4,4-dimethyl-2-oxazoline. About 10 cc (approximately 6.7 g, 250 mmoles) cold liquid hydrogen cyanide was then placed into the previously chilled addition funnel. After the addition funnel was stoppered, the cyanide was added to the stirred mixture in the 3-necked flask. The reaction mixture was then warmed until the hydrogen cyanide refluxed gently. At the start of refluxing the reaction temperature was about 60° C. and this temperature rose slowly during the next five hours to 80° C. The reaction was then continued at 80° for an additional 18 hours. Thin-layer chromatographic examination of the mixture at the end of this time disclosed almost no unreacted starting material, with a major spot running at $R_f$ 0.4 and minor amounts of several other substances. The chromatographic system used involved the bottom layer from a mixture of 25 parts 1,2-dichloroethane, 5 parts tert-butanol, 1 part water and 1 part acetic acid and employed Analtech, Inc. "Uniplate" thin-layer chromatography plates precoated with a 250 micron layer of silica gel GF. The major spot was developed with each of three indicator sprays: 1) freshly prepared diluted potassium permanganate in acetone; 2) 3.5 percent phosphomolybdic acid spray reagent of E. Merck AG, distributed by Brinkman Instruments, Inc.; and 3) iodine vapor. The slow development of an intense sopt with permanganate was indicative of a saturated alcohol. The intense red-brown coloration with iodine was indicative of an oxazoline moiety. The phosphomolybdic acid was employed as a non-specific reagent for detection of all materials that may have been present.

The above reaction mixture was distilled and the fraction boiling between 90° and 125° C. at 0.2–0.3 Torr was collected. This fraction amounted to 26.8 g and was estimated by thin-layer chromatographic examination to be about 75 percent pure. Upon standing, most of this product crystallized. The supernatant oil was then removed by decantation and the crystalline material remaining triturated with carbon tetrachloride, filtered and washed with an additional quantity of this solvent. The resulting cake was recrystallized from carbon tetrachloride giving 10 g of a colorless crystalline material melting at 71°–72° C. Thin-layer chromatographic examination disclosed only one spot at $R_f$ 0.4. The product structure was confirmed by infrared absorption, KBr pellet; 3.15 $\mu$ (hydroxyl), 4.47 $\mu$ (nitrile), 5.97 $\mu$ (oxazoline); the nmr spectrum (CDCl$_3$) showed peaks at δ 1.27 (6H, s, CH$_3$-C-CH$_3$), 2.78 (3H, s, CH and CH$_2$), 3.81 (1H, s, OH), 3.93 (2H, d, CH$_2$), and 3.97 (2H, s, CH$_2$). An nmr curve in D$_2$O exhibited features similar to that in CDCl$_3$ above except that the hydroxyl proton was exchanged and consequently did not exhibit an absorption band.

B. Dehydration of 2-(1-cyano-3-hydroxy-2-propyl)-4,4-dimethyl-2-oxazoline to 2-(3-cyano-2-propenyl)-4,4-dimethyl-2-oxazoline Into a 100 cc 3-necked flask fitted with a magnetic stirrer, thermometer and heating mantle was placed 4.0 g 2-(1-cyano-3-hydroxy-2-propyl)-4,4-dimethyl-2-oxazoline and 40 cc acetic anhydride. The mixture was heated to 115° C. during 25 minutes and held at this temperature an additional 10 minutes and then allowed to cool. Examination of the reaction mixture, using thin-layer chromatography employing the system described above, disclosed a major product spot at $R_f$ 0.9, a trace of an unidentified material at $R_f$ 0.5, and no detectable starting material. A deep color indication with iodine vapors showed that the oxazoline moiety had survived the reaction. Instantaneous reaction with the permanganate indicator demonstrated unsaturation in the molecule. The spot exhibited an alkaline (blue) reaction with bromocresol green indicator. Similar results are obtained by heating at a temperature of 140° C. The acetic acid and excess acetic anhydride were distilled at 15–20 Torr pressure to a pot temperature of 60° C. The syrupy residue was then treated with 5 cc carbon tetrachloride and allowed to crystallize cold. The crystalline material was filtered, washed with fresh cold carbon tetrachloride and dried. The crystals weighed 2.4 g, melted at 86°–88° C. and exhibited only one spot upon thin-layer chromatography and one elution band during vapor phase chromatography. The indicated structure was confirmed by ir absorption (KBr pellet), 4.43 $\mu$ (nitrile), 5.98 $\mu$ (oxazoline), 6.15 $\mu$ (terminal unsaturation), no absorption at 3.15 $\mu$ indicating absence of hydroxyl; the nmr spectrum (CC14) showed peaks at $\delta$1.33 (6H, s, CH$_3$-C-CH$_3$), 3.46 (2H, s, $\Delta$CH$_2$-), 4.00 (2H, s, -CH$_2$-) and 5.98 (2H, d, =CH$_2$).

C. Formation of Itaconic Acid by Hydrolysis of 2-(3-cyano-2-propenyl)-4,4-dimethyl-2-oxazoline Into a 50 cc 3-necked flask fitted with a magnetic stirrer, thermometer, reflux condenser and heating mantle was placed 1.1 g (6.7 mmoles) 2-(3-cyano-2-propenyl)-4,4-dimethyl-2-oxazoline and 20 cc (24 mmoles) 1.2 N aqueous hydrochloric acid. The mixture heated to reflux at 90°–100° C. and reflux continued for 18 hours. The mixture was then evaporated under reduced pressure at 37° C. The residue was treated with 3 cc cold water and the undissolved crystalline material filtered. The cake was washed with a small additional amount of cold water and dried to constant weight. The product weighed 0.25 g and melted at 152°–156° C. One recrystallization from water provided a substance identical in all respects to an authentic sample of pure itaconic acid.

EXAMPLE II

Similar results are obtained by conducting the heating-dehydration step in Example I(B) at a temperature of about 70° C., and substituting acetic acid for acetic anhydride.

EXAMPLE III

Itaconic acid is similarly made by following the procedure of Example I, except that an equivalent amount of 2-(3-hydroxy-2-propenyl)-4,4-di-(n-butyl)-2-oxazoline is substituted for 2-(3-hydroxy-2-propenyl)-4,4-dimethyl-2-oxazoline.

EXAMPLE IV

FORMATION OF PARACONIC ACID BY HYDROLYSIS OF 2-(1-CYANO-3-HYDROXY-2-PROPYL)-4,4-DIMETHYL-2-OXAZOLINE

Into a 20 cc round bottomed flask fitted with a heating mantle, reflux condensor and a magnetic stirrer was placed 0.5 g 2-(1-cyano-3-hydroxy-2-propyl)-4,4-dimethyl-2-oxazoline, 14 cc water and 1 cc 36.5 percent hydrochloric acid. The mixture was refluxed 18 hours at 90°–100° C., cooled and extracted continuously with ether until examination of the aqueous layer by thin layer chromatography disclosed almost complete removal of the organic acid formed during the hydrolysis. The ether extract was then dried over anhydrous magnesium sulfate, filtered and concentrated under reduced pressure to a viscous residue which crystallized upon cooling. This crude cyrstalline material melted at 50°–55° C. and exhibited infrared absorption essentially identical to that of an authentic specimen of paraconic acid (m.p. 59–62) prepared according to Fittig, Chem. Berichte 23, 91 (1890) and Ingold, Shoppee and Thorpe, J. Chem. Soc. 1926, 1,488. Thin-layer chromatography of the crude material using the system described in Example I disclosed a major spot at the same R$_f$ as paraconic acid and a trace of material at the same R$_f$ as itaconic acid. The latter spot exhibited all of the characteristic responses of itaconic acid to the several indicator reagents used.

EXAMPLE V

PREPARATION OF TRANS 2-(1-CYANO-2-PROPENYL)-4,4-DIMETHYL-2-OXAZOLINE BY DEHYDRATION OF 2-(1-CYANO-3-HYDROXY-2-PROPYL) 4,4-DIMETHYL-2-OXAZOLINE

Into a 250 cc 3-necked, round-bottom flask fitted with a heating mantle, magnetic stirrer, thermometer, Vigreaux column topped with a Dean-Stark water separator and condenser was placed 16 g 2-(1-cyano-3-hydroxy-2-propyl)-4,4-dimethyl-2-oxazoline, 100 cc xylene, 0.12 g (1 mmole) triethylenediamine and 13 $\mu$l 48 percent (0.1 mmole) aqueous hydrogen bromide. The mixture was heated to reflux at 135°–140° C. and refluxing maintained for 3 hours during which time about 1 cc of water was collected in the Dean-Stark tube. The apparatus was then modified to allow for distillation of the product mixture, the xylene was stripped and the product collected between 114°–128° C/20 Torr. The distilled product crystallized spontaneously upon cooling and weighed 5.4 g melting at 67°–74° C. One recrystallization from isooctane gave a product melting 71°–75° C. exhibiting a major spot at R$_f$ 0.75 with a just detectable impurity at R$_f$ 0.60 using the TLC system described in Example I. The structure was confirmed by ir absorption peaks (KBr) at 4.52 $\mu$ (nitrile), 6.07 $\mu$ (oxazoline) and no OH absorption; nmr (CC14) 1.29 (6H, s, CH$_3$-C-CH$_3$), 2.28 (3H, s, -CH$_3$), 4.00 (2H, s, -CH$_2$-) and 6.01 (1H, s, CH-). The trans configuration was confirmed by hydrolysis to mesaconic acid under conditions proved incapable of causing isomerization of either the starting material or product.

Comparable results are also obtained by the use of decahydronaphthalene or chlorobenzene instead of xylene.

The trans 2-(1-cyano-2-propenyl)-4,4-dimethyl-2-oxazoline is then hydrolyzed to form mesaconic acid by the procedure described in Example I.

EXAMPLE VI

PREPARATION OF CIS 2-(1-CYANO-2-PROPENYL)-4,4-DIMETHYL-2-OXAZOLINE BY DEHYDRATION OF 2-(1-cyano-3-HYDROXY-2-PROPYL)-4,4-DIMETHYL-2-OXAZOLINE The procedure of Example V was repeated except that the triethylene diamine and hydrogen bromide were replaced by 0.2 mmoles of triethylenediamine and 0.2 mmoles of concentrated (37 percent) hydrochloric acid and the reaction mixture was refluxed at 140°–160° C. for a total of 24 hrs. Examination of the reaction product by thin layer and vapor phase chromatography disclosed the presence of cis 2-(1-cyano-2-propenyl)-4,4-dimethyl-2-oxazoline as well as its trans isomer and 2-(3-cyano-2-propenyl)-4,4-dimethyl-2-oxazoline.

What is claimed is:
1. A compound selected from those of the formulae:
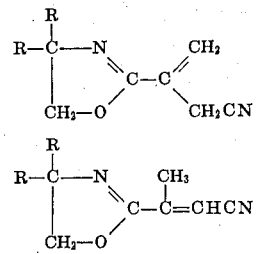
and
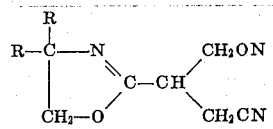
wherein R is alkyl having one to four carbon atoms.
2. 2-(3-cyano-2-propenyl)-4,4-dimethyl-2-oxazoline.
3. 2-(1-cyano-2-propenyl)-4,4-dimethyl-2-oxazoline.
4. 2-(1-cyano-3-hydroxy-2-propyl)-4,4-dimethyl-2-oxazoline.
* * * * *